United States Patent Office 3,350,401
Patented Oct. 31, 1967

3,350,401
POLYMETHYLENE BIS-QUATERNIZED DERIVATIVES OF TRIETHYLENEDIAMINE
Paul F. Strohm, Philadelphia, Pa., assignor to Air Products and Chemicals, Inc., Philadelphia, Pa., a corporation of Delaware
No Drawing. Filed Dec. 20, 1965, Ser. No. 515,182
1 Claim. (Cl. 260—268)

This invention relates to quaternary derivatives of 1,4-diazabicyclo(2.2.2)octane and alkyl-substituted 1,4-diazabicyclo(2.2.2)octane. More particularly, this invention is concerned with quaternary amines of the formula

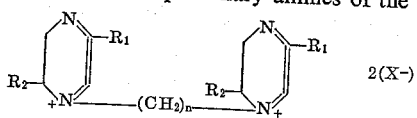

where $R_1$ and $R_2$ are methyl or hydrogen; $n$ is 5; and X is iodide.

It has now been discovered that certain novel quaternary derivatives of 1,4-diazabicyclo(2.2.2)octane and alkyl-substituted 1,4-diazabicyclo(2.2.2)octane, which have a formula corresponding to

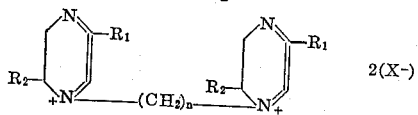

where $R_1$ and $R_2$ are methyl or hydrogen; $n$ is 5; and X find application and may be used as emulsifying agents, corrosion inhibitors, anti-static agents and as preservatives for cellulosic materials. The preparation of these particular quaternary amines is shown in the following examples.

Example I 10 grams of 1,5-diiodopentane, dissolved in 7 cc's of ethyl alcohol, was added slowly to a solutiin of 10 grams of 1,4-diazabicyclo(2.2.2)octane in 7 cc's of ethyl alcohol. The solution was stirred until a white precipitate separated from the solution. The white precipitate material was removed by filtration and recrystallized from a solution of 50% acetone in ethyl alcohol. Analysis of the recrystallized material (17 grams) established it as pentamethylene-bis-[4-aza - 1 - azoniabicyclo(2.2.2)octane] diiodide having a melting point of 227 to 228° C. and an iodine content of 46.3% (theoretical 46.4%).

Example II 3 grams of 1,5-diiodopentane, dissolved in 4 cc's of ethyl alcohol, was added slowly to a stirred solution of 4 grams of a 2-methyl-1,4-diazabicyclo(2.2.2)octane in 4 cc's of ethyl alcohol. The reaction was exothermic and upon cooling the reaction mixture to room temperature a white solid precipitated from the solution. This was removed by filtration and recrystallized from 50% acetone in ethyl alcohol. Analysis of the recrystallized material, including NMR analysis (Nuclear Magnetic Resonance Spectroscopy Analysis), established it as pentamethylene-bis-[3-methyl-4 - aza-1 - azoniabicyclo(2.2.2) octane] diiodide having a melting point of 220 to 221° C. and an iodine content of 43.8% (theoretical 44.0%).

As a preservative for cellulosic materials, compounds such as pentamethylene-bis-[3-methyl-4 - aza - 1-azoniabicyclo (2.2.2) octane] diiodide may be used for the prevention of fungus or mold growth on leather, fabrics and plants.

Example III 3 grams of 1,5-diiodopentane and 4.5 grams of 2,5-dimethyl-1,4-diazabicyclo(2.2.2)octane were added to 8 cc's of ethyl alcohol. A slight increase in the temperature of the reaction was observed but no precipitate formed even after allowing the reaction mixture to stand for 72 hours. However, a white precipitate was formed after adding 20 cc's of acetone and allowing the mixture to stand for an additional hour. The precipitate was removed by filtration and recrystallized from 25% ethyl alcohol in acetone. Analysis of the recrystallized material established it as pentamethylene-bis-[2,5-dimethyl-4 - aza - 1-azoniabicyclo(2.2.2)octane] diiodide having an iodine content of 41.9% (theoretical 41.9%).

As an anti-static agent, compounds such as pentamethylene-bis-[2,5-dimethyl-4 - aza - 1 - azoniabicyclo (2.2.2)octane] dihalide may be employed in the molding of plastics and in the spinning of textile fibers.

Obviously, many modifications and variations of the invention as hereinbefore set forth may be made without departing from the spirit and scope thereof, and therefore only such limitations should be imposed as are indicated in the appended claim.

What is claimed is:

Pentamethylene-bis-[2,5-dimethyl-4 - aza - 1 - azoniabicyclo(2.2.2)octane] diiodide.

References Cited

T. P. Abiss et al.: The Interaction of Triethyl nediamine and Dibromomethane, 1,2-Dibromomethane and 1,3-Dibromopropane, June 1964, pp. 2248–54, J. Chem. Soc.

HENRY R. JILES, *Primary Examiner.*

R. BOYD, *Assistant Examiner.*